Figure 1:
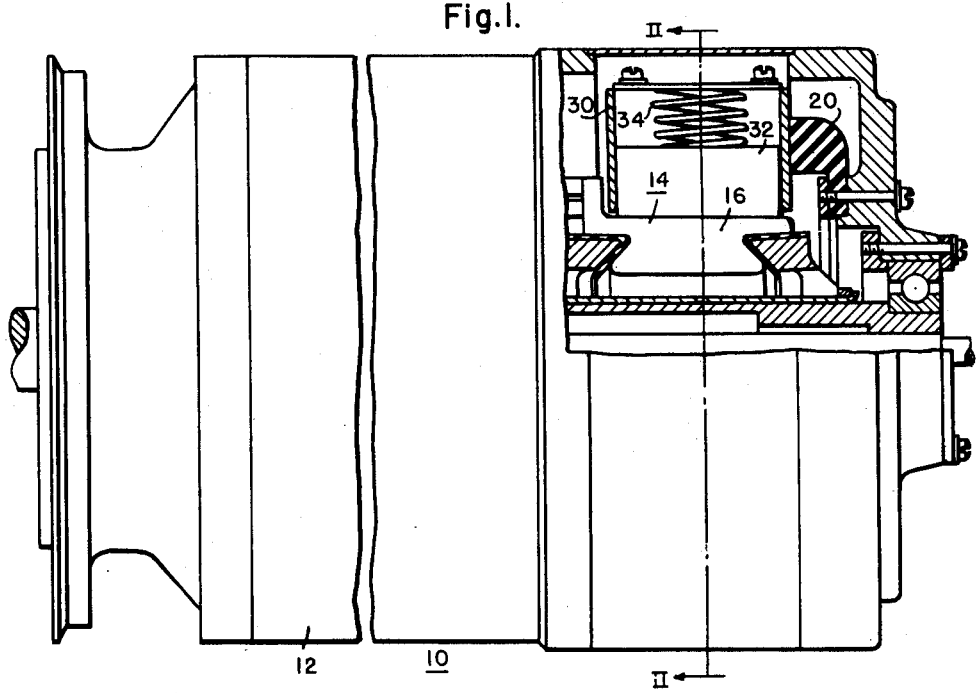

March 21, 1950     H. M. ELSEY     2,501,321
DYNAMOELECTRIC APPARATUS AND CURRENT COLLECTOR
CONDITIONING MEMBERS THEREFOR
Filed Aug. 3, 1948

Non-Current carrying member comprising a metal halide.

WITNESSES:
C.A. McCloskey.
Leon M. Garman.

INVENTOR
Howard M. Elsey
BY
Frederick A. ____
ATTORNEY

Patented Mar. 21, 1950

2,501,321

UNITED STATES PATENT OFFICE 2,501,321

DYNAMOELECTRIC APPARATUS AND CURRENT COLLECTOR CONDITIONING MEMBERS THEREFOR

Howard M. Elsey, Oakmont, Pa., assignor to Westinghouse Electric Corporation, East Pittsburgh, Pa., a corporation of Pennsylvania Application August 3, 1948, Serial No. 42,166

2 Claims. (Cl. 171—325)

This invention relates to dynamo-electric apparatus and, in particular, to such apparatus embodying a current collector conditioning member therefor to provide for improved cooperation between the current carrying brushes and the current collector.

In my Patent 2,414,514, there is disclosed, among other things, a current carrying brush containing a metal halide to improve the operation of the brush in contact with the current collector. Such brushes have given outstanding results when employed in a great variety of apparatus and particularly when employed in aircraft generators. However, there are certain types of dynamo-electric apparatus in which extraordinary operating conditions are present. Specifically, there has been developed a combination motor-generator device that operates as a driving motor for short periods of time and then operates as a generator for the greater proportion of the time of its use. The device when operating as a generator does not handle more than 400 amperes of electrical current and ordinarily averages below 100 amperes. When operated as a motor, the device may be required to handle for brief periods 1500 amperes and more of electrical current. In order to meet certain weight and design limitations, this device is constructed to function indefinitely satisfactorily under its generator conditions of operation and when operated as a motor it is subjected to highly excessive currents and overloads which are tolerable only because of their short duration and the expectancy that no permanent damage will be done thereby. This device is employed in aircraft service where it has to function at altitudes of above 25,000 feet. In actual operation, when operated as a motor with a current of 1500 amperes and more, the current carrying brushes become heated to such an extent that they glow adjacent to the commutator. At these high temperatures, most materials present in the carbon brushes, including many metal halides, are evaporated almost completely for a substantial distance from the face of the brush. Furthermore, the intense heat tends to impair the normal commutator film and renders the commutator quite rough. Thereafter, when the device is operating under high altitude conditions, the carbon brushes wear by dusting and disintegration with such rapidity that the operation of the device is rendered unsafe.

Furthermore, certain high capacity generators for aircraft operation have been found to pass such excessive currents through the carbon brushes under extreme conditions requiring substantially maximum output that any impregnant in the brushes, such, for example, as lead iodide, exert a substantial vapor pressure and are readily dissipated from the carbon brushes. In these generators, as well as in the previously described motor-generator device, therefore, carbon brushes with metal halides present are not entirely satisfactory.

The object of this invention is to provide a non-current carrying member for conditioning current collectors of dynamo-electric apparatus to provide a satisfactory life of the current carrying brushes operating in combination with the current collector.

A further object of the invention is to provide dynamo-electric apparatus in which the current collector has disposed thereagainst both current carrying carbon brushes and current collector conditioning members which carry no current to enable the current carrying brushes to have improved life and service.

Other objects of the invention will in part be obvious and will in part appear hereinafter.

Figure 2:
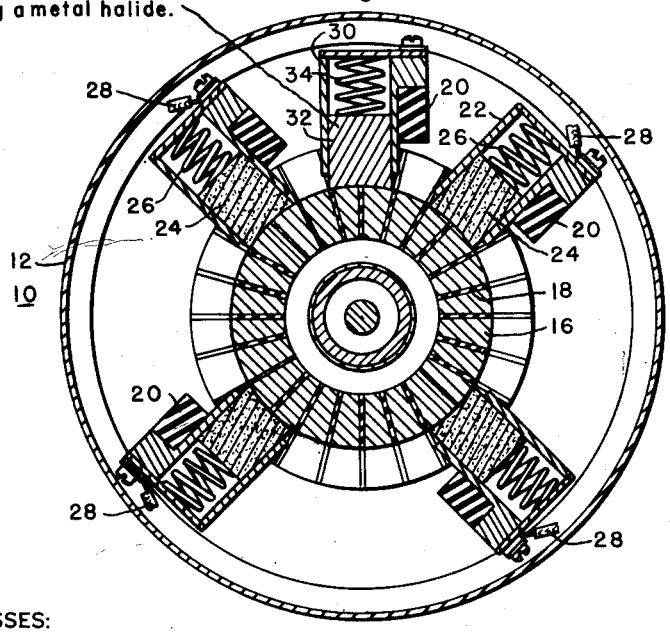

For a fuller understanding of the nature and objects of the invention, reference should be had to the following detailed description and drawing, in which:

Figure 1 is a view in elevation, partly in section, of a dynamo-electric device; and Fig. 2 is a section on line II—II of Fig. 1.

In accordance with this invention, the current collectors of dynamo-electric apparatus are treated by contacting thereagainst a current collector conditioning member through which no electrical current is passed. The conditioning member comprises as its essential component at least 10% of a substantially non-hygroscopic metal halide. The current collector conditioning member applies to the current collector a film of a metal halide which functions to generate or develop on the current collector, which is normally of copper or a copper base alloy, a low-friction film composed substantially of copper oxide. This low-friction film is normally visible as a dark area. This dark low-friction film enables carbon brushes to carry electrical current to the current collector efficiently without any substantial friction between the carbon brush and the current collector. If this film is not present so that the raw copper is exposed, the carbon brushes are subjected to a severe abrading action which causes them to dust and disintegrate rapidly. The film is sensitive to both high temperatures and the atmosphere in which it is present so that at extremely low moisture and oxygen pressures in the atmosphere, it tends to disappear or else is not generated as fast as necessary for satisfactory operation of the dynamo-electric apparatus. Also, as the electrical current passing between the carbon brushes and the current collector becomes greater, the film disappears more rapidly.

It has been found that if a substantially non-hygroscopic metal halide is applied to the current collector, it will tend to rebuild or to maintain the lubricating film whereby carbon brushes will operate thereagainst without any substantial rate of wear. This will take place even if the current carrying brushes are subjected to excessive currents.

It is critically necessary that the commutator conditioning members of the present invention be so applied to current collectors that they do not carry electrical current and apply a film of the metal halide to the current collector. Referring to Fig. 1 of the drawing, there is illustrated a dynamo-electric apparatus comprising a generator 10 having an exterior casing 12 within which the usual rotor operates. Fixed to the rotor for rotation therewith is a commutator 14 comprising a plurality of copper segments 16 which, as shown in Fig. 2, are insulated from one another by insulation 18. Attached to the casing 12 is a ring 20 provided with brush holders 22 for supporting carbon brushes 24 for contact with the commutator 14. As shown more clearly in Fig. 2, there are four brush holders 22 supporting the carbon brushes 24 for radial motion with respect to the axis of the rotor. The brush holders 22 are fitted with springs 26 resiliently urging the brushes 24 into contact with the commutator. Electrical conductors 28 are connected to the brush holders 22 and thereby are in circuit relation with the brushes 24 for the purpose of collecting electrical current produced by the generator 10.

The brushes 24 may consist of the usual carbonaceous materials, such, for example, as graphite, coke and the like, and, if desired, copper to increase the conductivity, and a binder. The brushes 24 are designed for the particular apparatus and conditions to be met in the service as is well known.

As shown in Fig. 2, a holder 30 supported by ring 20 but insulated therefrom is disposed intermediate two current carrying brushes 24. Within the holder 30 is disposed the commutator conditioning member 32 comprising at least 10% by weight of metal halide, and a binder. A spring 34 is disposed within the holder to resiliently urge the member 32 into contact with the surface of the commutator to apply to the copper a film of the metal halide.

One or more members, such as 32, may be applied against a single commutator depending upon the severity of operating conditions. Very little of the metal halide need be applied to improve the surface of the commutator so as to provide thereon the desirable copper oxide film. Under ordinary circumstances, the rate of wear of the member 32 will be similar to the rate of wear of the carbon brushes 24 so that replacement and other servicing may be effected simultaneously for both.

For the purpose of this invention, the current collecting conditioning members are composed of from 10% to 95% by weight of the non-hygroscopic metal halide and the balance including a binder. It has been found that particularly good results are secured if the members are composed of from 40% to 80% by weight of one or more metal halides and the balance is composed of a thermoset organic resin.

The conditioning members may be prepared by employing a metal halide such as, for example, one or more of the following salts:

| | |
|---|---|
| $PbI_2$ | $CdI_2$ |
| $PbBr_2$ | $CdBr_2$ |
| $PbCl_2$ | $CdCl_2$ |
| $PbF_2$ | $HgI_2$ |
| $CaF_2$ | $HgBr_2$ |
| $CdF_2$ | $Cu_2Br_2$ |
| $MgF_2$ | $AgI$ |

From 10 to 95 parts by weight of the metal halide are admixed with from 90 to 5 parts by weight of a moldable thermosettable resin, such, for example, as a phenol-aldehyde molding powder or a melamine formaldehyde molding powder. The molding powders may be composed entirely of a pulverized phenol-aldehyde reaction product, for example, though it is preferred to employ a mixture of which the main ingredient is the reaction product. Thus we have found molding powders embodying a phenol-aldehyde resin, lamp black, and a mold lubricant, such as calcium stearate, excellent for the purpose of this invention. The metal halide and the moldable resin are mixed intimately and then molded under heat and pressure until the resin bonds the whole into a thermoset member.

The metal halide may be treated with a solution of a thermosettable resin, such, for example, as a phenol-formaldehyde varnish, a melamine-formaldehyde varnish, or the like. Thereafter, the solvent may be evaporated from the mixture and the mixture of metal halide and resin molded under heat and pressure to produce a member of required size and shape. By varying the proportions of the metal halide and binder, the hardness, rate of wear, and the conditioning characteristics of the member may be varied.

In some cases the molded conditioning members are heat-treated to evaporate harmful volatiles derived from the binder. A treatment at temperatures of 200° C. to 300° C. for several hours will carbonize organic binders, and will cause volatile hydrocarbons, water and the like to be withdrawn. The time and temperature of the heat-treatment should not be such as to cause the metal halide to leave in any substantial amount.

It will be appreciated that other binders, such, for example, as pitch, may be employed in combination with a metal halide. If desired, the members may include graphite or other agents to provide for a desired rate of wear of the members.

Since many metal halides are of high density, it has been found that a low density filler, such as lamp black, should comprise a portion of the binder so that the member is of lower density and follows the commutator better. The binder may comprise 50% of the low density filler for such purpose.

As an example of the preparation of the members, 80 parts by weight of lead iodide were admixed with 20 parts by weight of a phenolic molding powder. A suitable phenolic molding powder may be the reaction product of one mole of phenol and from 0.8 to 0.88 mole of formaldehyde reacted in the presence of 1% of an acid catalyst, such as oxalic acid and hydrochloric acid, the reaction being carried out at reflux for 1½ hours, the reaction product then being evacuated to remove water and heated at 130° C. for an hour until a ball and ring temperature of 80° C. to 90° C. is reached. The resulting liquid resin is poured into a pan and cooled to a solid at room temperature. The solid resin is ground to a fine powder and 88 parts of the powder admixed with 12 parts of hexamethylenetetramine to produce the phenolic molding powder. The mixture of the molding powder and lead iodide was put into a mold where it was subjected to a pressure of 500 pounds per square inch and then the molded member was put into an oven at 250° C. for 8 hours to cause the resin to condense and polymerize, as well as to cause decomposition products, water vapor and other harmful volatiles to be removed.

The member so prepared was applied to a commutator against which two standard carbon brushes carrying electrical current operated. The commutator was maintained at an absolute pressure of 14 millimeters of mercury, corresponding to the pressure at a 40,000-foot altitude, with air having a dew point below −50° C. circulating around the commutator. The commutator was revolved at 3600 R. P. M. and a current of approximately 200 amperes per square inch of brush contact surface was passed through the current carrying brushes. During many hours operation, dusting did not take place and the brushes wore at a rate less than 0.001 of an inch per hour under these conditions. Under the same conditions, with the exception that the metal halide member was not applied to the commutator, the carbon brushes dusted within a few minutes after the commutator was started rotating at a rate exceeding 0.1 inch per hour.

Other phenolic molding powder compositions made in other proportions may be employed as binders for the metal halides.

While this invention is particularly applicable for use in aircraft service, it is advantageous for use in dynamo-electric apparatus operating at the earth's surface. It is especially adapted for use where extremely severe conditions of high current and high temperatures between brushes and a current collector occur, but may be employed in electrical apparatus of all kinds wherein the conditions are not so severe with good results. Both commutators and slip rings may be beneficially improved by this invention.

The present invention is particularly suitable for use in dynamo-electric apparatus wherein the carbon brushes carry above 200 amperes of current per square inch of brush contact surface. However, it will be found useful for use where the current density is below this value.

Since certain changes may be made in the invention and different embodiments thereof can be prepared without departing from the scope of the invention, it is intended that all matter contained in the above description or shown in the accompanying drawing shall be interpreted as illustrative and not in a limiting sense.

I claim as my invention:

1. In dynamo-electric apparatus, a rotatable current collector, a relatively stationary brush disposed in contact with the current collector, means connected to the brush for supplying electrical current thereto and to the current collector, and a relatively stationary member in contact with the current collector, the relatively stationary member being insulated to render it substantially free from flow of electrical current, the relatively stationary member comprising from 10% to 95% by weight of substantially non-hygroscopic metal halide and the balance including a binder for the metal halide.

2. In dynamo-electric apparatus, a rotatable current collector, a relatively stationary brush disposed in contact with the current collector, means connected to the brush for supplying electrical current thereto and to the current collector, and a relatively stationary member in contact with the current collector, the relatively stationary member being insulated to render it substantially free from flow of electrical current, the relatively stationary member comprising from 10% to 95% by weight of substantially non-hygroscopic metal halide and the balance including a binder for the metal halide, the binder comprising a thermosetting resin.

HOWARD M. ELSEY.

REFERENCES CITED

The following references are of record in the file of this patent:

UNITED STATES PATENTS

| Number | Name | Date |
| --- | --- | --- |
| 1,867,524 | Orne | July 12, 1932 |
| 2,167,313 | Rohrs | July 25, 1939 |
| 2,414,514 | Elsey | Jan. 21, 1947 |
| 2,414,543 | Moberly | Jan. 21, 1947 |